DOUBLE TRANSFER CURIE-POINT AND MAGNETIC BIAS TAPE COPY SYSTEM

Original Filed Dec. 5, 1966

INVENTOR
Alfred M. Nelson

By Smyth, Pavitt, Siegemund & Jones

ATTORNEYS

United States Patent Office

Re. 27,685
Reissued June 26, 1973

27,685

DOUBLE TRANSFER CURIE-POINT AND MAGNETIC BIAS TAPE COPY SYSTEM

Alfred M. Nelson, Redondo Beach, Calif., assignor to The Magnavox Company

Original No. 3,496,304, dated Feb. 17, 1970, Ser. No. 599,268, Dec. 5, 1966. Application for reissue Nov. 1, 1971, Ser. No. 194,763

Int. Cl. G11b *5/86*

U.S. Cl. 179—100.2 E 12 Claims

Matter enclosed in heavy brackets [ ] appears in the original patent but forms no part of this reissue specification; matter printed in italics indicates the additions made by reissue.

ABSTRACT OF THE DISCLOSURE

Method and system is disclosed for copying magnetic recording, for example, on a regular magnetic tape onto another tape, for example, of the same type, by using an intermediary carrier having a relatively low Curie point, preferably a lower Curie point than the master tape, and having a room temperature coercivity above the coercivity of the copy tape. The content of the master tape is progressively copied onto the intermediary by thermomagnetic technique and after cooling, the information is transferred from the intermediary again progressively to the copy tape by magnetic high-frequency bias slowly decaying as the respective tape increment recedes from the bias source.

The present invention relates to a method and system for the transfer of recorded information from one magnetic storage medium such as a tape to another magnetic storage medium, possibly also a tape.

The copying of a magnetic tape recording from a tape onto another tape having similar magnetic characteristics presents inherent difficulties, because in most instances the magnetic field emanating from a magnetized carrier is below the magnetic field strength which was necessary to produce that magnetization itself. Thus, the magnetic field emanating from the recording on a tape itself is too weak to leave any sufficient remanent magnetization in another tape even when the magnetizable materials of the two tapes are placed in intimate contact with each other. For example, normal iron oxide tapes have a coercivity of about 300 oersteds while a saturation recording rarely produces a magnetization resulting in a field higher than 100 oersteds in the immediate vicinity of the tape.

Some methods have been developed in the past to provide such a transfer of recorded information by supplying to the copy tape additional magnetizing fields. These methods, however, depend on a dissimilarity in the magnetic characteristics of the two tapes; in particular, the master tape must have a higher coercivity. Since the recording on the master tape must not be destroyed by the copying process, the additional or biasing magnetization must remain below the coercivity of the master tape. The biasing magnetization, however, must be at least close to the coercivity of the copy tape so that it can be magnetized also at saturation. Thus, copy and master tape cannot have similar magnetic characteristics.

The invention now permits the copying of recorded information from a master tape onto a copy tape which may have exactly the same magnetic characteristics and properties as has the master tape. It is suggested to use an intermediate carrier, having a higher coercivity than the copy tape and being maintainable in the paramagnetic state for a controllable period of time, for example, by way of heating. In that state the intermediate carrier is brought into contact with the master tape, whereby a heat flow from the intermediate carrier to the master tape must not render the material of the master tape also paramagnetic and/or destroy the backing member, binders, etc., of the tape. In the preferred form, the intermediate carrier is a thin layer of a low Curie point material, deposited on a suitable support. Preferably, the intermediate carrier should have a Curie temperature below the Curie point of the master so that for suitably selected operating temperatures the master will remain ferromanetic, while the intermediate carrier is paramagnetic. That operating temperature is established by heating the intermediate carrier.

During the period of contact between intermediate carrier and a portion of the master tape, the rather weak magnetic field emanating from the latter can align the weak dipoles of the paramagnetic carrier. Furthermore, during the period of contact the paramagnetic carrier reverts to the ferromagnetic state, so that heating must be terminated prior to the termination of the period of contact. Since this reversion occurs, while still in contact with the master tape, the aligning influence of the magnetization caused by the master persists, and a magnetic copy is thus produced onto the carrier.

Since the intermediate carrier will have a very small coercivity and a very small remanence at temperatures slightly below the Curie point, the carrier becomes easily saturated even though the magnetizing field is quite small. As the intermediate carrier cools further, that saturation remains but the hysteresis loop expands and the remanent magnetization increases accordingly. The interplay between thermal movement and aligning forces set up by the magnetic field of the magnetized master will result in saturation magnetization in the intermediate only where the master showed maximum magnetization, lesser magnetization strength in the master will result in below saturation remanence in the intermediate carrier.

The magnetic recording has now been copied or imaged onto the intermediate carrier without destroying the master. For transfer from the intermediate carrier to the copy tape, use is made of the condition that the intermediate carrier has to have a higher coercivity than has the copy tape, but it is emphasized that there are no direct restrictions whatsoever as between the magnetic properties of master and copy tapes. The only restrictions result from the conditions set for the characteristics and properties of the intermediate carrier in relation to master and copy tapes.

Intermediate carrier and copy tape are now brought into physical contact, and an A.C.-magnetic field is applied additionally to the area of contact. The alternating auxiliary magnetic field must have peak values above the coercivity of the material of the copy tape, but below the coercivity of the intermediate carrier. The remanent magnetization in the copy tape results now from vector addition of the magnetic field applied at any instant by the intermediate carrier to the copy tape and by the auxiliary biasing field. Thereupon the recording image is, again nondestructively, copied into the copy tape. That latter process can be repeated to produce more than one copy from the same magnetic image on the intermediate carrier.

Conventional magnetic tapes using iron oxides have a Curie point close to the order of $(10^3)^\circ$ C., and, as stated, a coercivity of about 300 oersteds. If one uses as intermediate carrier a layer of chrominum dioxide, the operating conditions are easily satisfied. The Curie point of chromium dioxide is below 200° C., and thus such a carrier can be rendered paramagnetic well below the Curie point of a conventional tape as master. The coercivity of chromium dioxide is as high as 600 oersteds, which is well above the coercivity of conventional tape. Hence, a transfer of magnetic recordings between similar conventional tapes using iron oxides as magnetically active material can readily be obtained when using a chromium dioxide carrier as an intermediate carrier for temporarily storing an image of the recording on the master. That imaging transfer from the master to the intermediate carrier uses thermomagnetic techniques and the transfer of the magnetic image on the intermediate carrier uses magnetic bias in the range defined by the difference in coercivities of chromium dioxide and the copy tape.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

Figure 1:
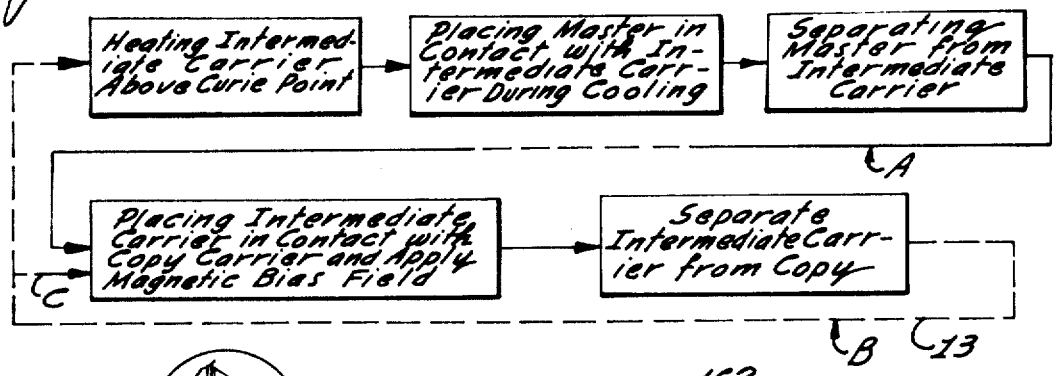
FIGURE 1 illustrates schematically a flow chart for practicing the inventive method.

The flow chart shown in FIGURE 1 is in substance a summary of the process steps outlined above. The interrupted line A indicates that there is no restriction whatever as to the period time for which the intermediate carrier may hold the recording. This includes the possibility that the content of a master tape is copied onto a similar length tape of the thermomagnetic material outlined above and this intermediate tape is then stored, brought to another location, etc. The information on the intermediate tape can thus be transferred to a copy tape at a different time and in a different place. As indicated by dotted line B, the intermediate carrier can be reused after copying has been completed and as intermediate carrier for a different copy process. The heating above Curie point prior to imaging from the master inherently operates as an erasure of any magnetization the carrier may then still have.

The heating process of the intermediate carrier and its contacting the master tape does not have to involve the entire length of either medium at the same time, but progressive portions of the intermediate carrier may be heated and brought into contact with progressive portions of the master. This leads to the most frequently desired type of copying in which actually the copy (or several) are to be produced from a master in one continuous operation. This means that the intermediate carrier does not have to have the capacity to hold the entire content of the master recording; instead, the loop shown in FIGURE 1 may be a continuous one in that progressive portions of the recording are copied in a manner outlined above, and portions of the intermediate carrier from which the information has been transferred to the copy tape, are free immediately to receive from the master the image of another portion of its recording. The sub-loop established with flow line C represents the production of multiple copies from the image on the intermediate carrier.

Figure 2:
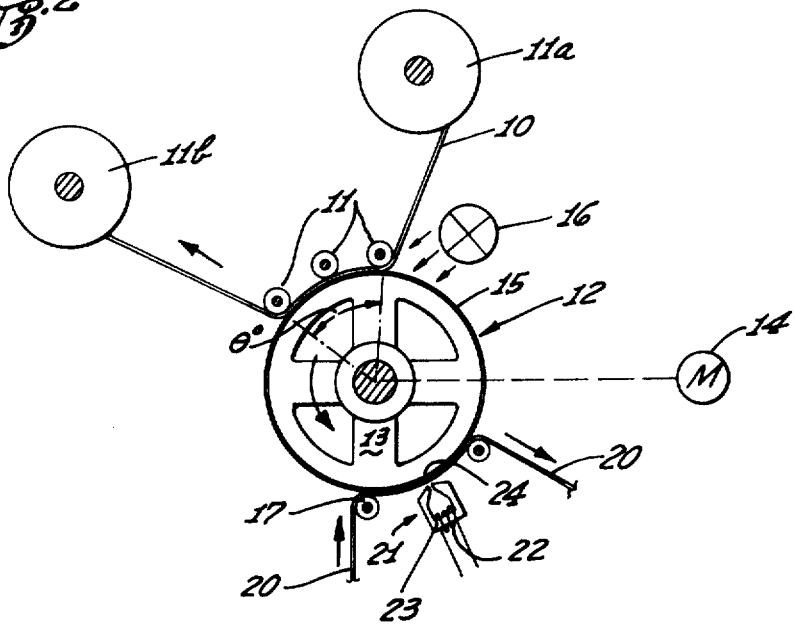
FIGURE 2 illustrates somewhat schematically a copy station in accordance with the preferred embodiment of the invention.

A station of this type is now depicted in FIGURE 2 and shall be used to explain the phenomena involved in some greater detail. Proceeding, therefore, to the detailed description of FIGURE 2 there is shown a normal or regular magnetic tape 10 having a magnetizable layer comprised of iron oxide particles or similar, ferromagnetic material used normally for the making of magnetic records. There are no limiting conditions to be imposed for this type of tape usable as master.

The tape 10 may be reeled from a payout reel 11a towards the copy station illustrated in the drawing. A plurality of guide pulleys serving as idlers 11 cause the tape 10 to pass through the copy station proper in intimate face-to-face contact with the outer circumference of a drum 12. The tape 10 will be in contact with the drum 12 over a particular circumferential distance thereof, measured as angle $\theta$ in reference to the axis of drum 12. The tape 10 leaves the copy station towards a take-up reel 11b. In the copy station the tape 10 may be advanced by the drum 12 and the idlers 11 then serve as pinch rollers. The critical point here is that tape 10 and drum 12 travel in slippage-free contact with each other, i.e., at precisely the same circumferential speed.

The drum 12 is constructed to have a supporting member 13 driven by a motor 14. The outer circumference of the drum 12 is provided with a layer 15 which is predominantly comprised of a material having a low Curie point and temperature dependent coercivity and remanence. For example, this material may be chromium dioxide which has also temperature dependent coercivity and remanence.

The tape 10, which can also be called the master tape, carries magnetic recordings of any kind and to be copied. As the drum 12 rotates a portion of its circumferential layer 15 will come into face-to-face contact with a portion of tape 10. Any incremental portion of the layer 15 will travel with a similar size incremental portion of magnetic tape 10 in face-to-face contact therewith and over the particular angular distance O. Specifically, the magnetically active portion or layer of the tape 10 faces the drum to directly engage the layer 15. The backing member of tape 10 faces away from the drum accordingly. As stated, tape and drum travel in slippage-free engagement until separated from each other, in that the tape 10 is guided away from the drum towards the take-up reel 11b.

There is next provided a heating source such as a lamp 16 which provides strong and continuous radiation towards the portion of the circumferential layer 15 on drum 12 just before coming into contact with the tape 10. The radiation is to have sufficient intensity that the portion of layer 15 when making first contact with the tape 10 has a temperature above the Curie point of layer 15. If the layer 15 has a thickness as is commonly used for recording layers on tape, which is about $210^{-4}$ inches, then about 200 milliwatt seconds/cm.$^2$ are needed to heat layer 15 above the Curie point. The intensity of the lamp 16 and the time a portion of layer 15 is actually being subjected to radiation are metered accordingly.

The layer 15 when entering into engagement with the magnetic layer of tape 10 has become paramagnetic. In the paramagnetic state the magnetic dipoles of the material are very weak and the material has hardly any coercivity and remanence. The magnetization defining the recording on tape 10 emanates only a rather weak magnetic field in its environment. This weak magnetic field is insufficient to magnetize regular tapes, as their room temperature coercivity is above the magnetic field which the recordings on the tape set up in the environment. The same holds true particularly for the chromium dioxide in layer 15 as it has a particularly high coercivity.

However, presently the material of layer 15 is paramagnetic, therefore, the magnetic field as provided by the recording on tape 10 suffices to align the magnetic dipoles of the paramagnetic material of layer 15 to thereby provide a mirror image of the portion on tape 10 in contact with layer 15. That image is not yet "fixed" because the material is still in its paramagnetic state. Thus, this alignment of the dipoles with the locally variable aligning field will exist only because the aligning field persists on drum 12 progresses in contact with tape 10. However, the heating of the layer 12 does not persist as the layer 15 travels in face-to-face contact with the tape 10, so that in fact the layer 15 will cool again rather rapidly. The intimate contact of layer 15 with tape 10 and the drum itself aid in the heat transfer from thin layer 15 to its environment.

The temperature in layer 15 will thus fall below the Curie point during the period of contact with tape 10, and the material of layer 15 thus reverts to the ferromagnetic state. The dipole strength of the material of layer 15 extends, its magnetic domains grow and the hysteresis loop of the material expands. This takes place under the continued influence of the locally variable magnetic field of the tape 10, as the same portion of tape 10 continues to travel in face-to-face contact with a portion of layer 15 while reverting from the paramagnetic state into the ferromagnetic state. Slippage-free contact between layer 15 and tape 10 is essential here to positively define the direction and intensity of the remanent magnetization anywhere in layer 15 to really produce an image of the locally variable recording held by tape 10.

This reversion of magnetic states under the influence of the magnetic field set up by the master can be regarded as the "fixing" of the latent image on the layer 15. One can see here, that the only condition to be imposed on the material used for tape 10 is that its Curie point should not be much below the Curie point of the material used for layer 15, because the magnetically active material of tape 10 should remain ferromagnetic throughout the copying procedure, otherwise the recording on the master would be destroyed. If the tape 10 is a regular magnetic tape in which the magnetically active material is composed of iron oxide, then this master has a Curie point which is several hundred degrees about the Curie point of chromium dioxide. However, care must be taken that the backing member and the binder used in tape 10 will not be destroyed Again, this presents no problem if the Curie point of layer 15 is below 200° C. so that the operating temperature can also be maintained below that value.

If the magnetically active material of master 10 has itself a low Curie point, then the heating from lamp 16 must be accurately metered so that layer 15 is heated just above its Curie point, if the magnetically active material of master tape 10 has the same Curie point, it still will not become paramagnetic because the thermal energy in layer 15 decays rather rapidly and in all directions. Thus, even in this situation it is possible to provide a magnetic image on layer 15 of the recording on tape 10 without destroying the information held on master tape 10.

Figure 3:
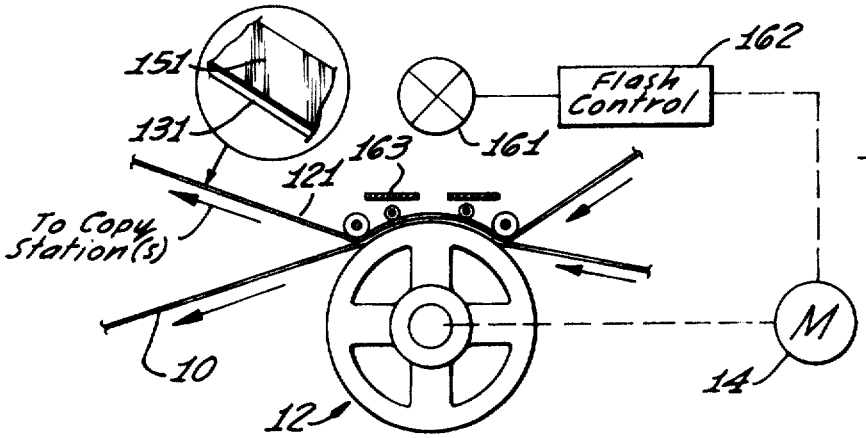
FIGURE 3 illustrates somewhat schematically a modified copy station for practicing the present invention.

In case the Curie points of master and intermediate carrier (layer 15) are rather close, it may be advisable to place the heater inside of drum 12 to establish a temperature gradient in layer 15 which drops towards its outer surface, so that that surface reaches just about the Curie point. At this point it should be emphasized that heating by an externally provided lamp is only a simple expedient for the general case. More critical operating conditions are explained below with reference to FIGURE 3.

The preceding remarks serve only to emphasize the possible range in which the present method and apparatus can be used, the normal and regular use for the invention will be the copying of information presently existing on normal iron oxide tapes, and here the Curie points of master and intermediate are so far apart, that the operating temperature is not critical, except for the melting point of the base of tape 10.

As a general condition, one can say that heating must be such that tape 10 will not be demagnetized and, of course, must not be destroyed physically. Furthermore, heating must not persist throughout the period of contact between tape 10 and layer 15. Although heating may extend into the period of such engagement, it must cease sufficiently before termination of the engaging relation so that the layer 15 will positively revert to the ferromagnetic state while still in contact with tape 10.

As the drum 12 continues to rotate the content of the magnetic tape 10 is progressively imaged onto progressive portions of layer 15. However, as stated, the drum serves only as an intermediate storage carrier. The second half of this copying station is comprised again of a set of guide pulleys-pinch rollers 17 placing a magnetic tape 20, the copy tape, into face-to-face contact with a portion of the circumferential layer 15 of drum 12 on which there is now a magnetic image as previously provided.

The single condition for the magnetic material of tape 20 is that its coercivity must be below that of the coercivity of the chromium dioxide material of layer 15. Again this condition is automatically fulfilled for regular magnetic tapes having iron oxides as magnetically active material.

For purposes of completion only, the following remarks are in order. It was stated above as a general rule that the copy process of the present invention permits copying from a master, where copy and master tape have similar magnetic properties. It was also stated that the imaging process onto an intermediate carrier is operable even if the master tape 10 has an active material the same (low Curie point) material as is used for layer 15. These two conditions may appear to be not completely consistent except that (1) the similarity of master and copy tapes is limited by the requirements of particular conditions relative to the properties of the intermediate carrier; and (2) in case the copy tape is to be of the low Curie point type, no intermediate carrier is needed at all, and the copy can be made directly by the thermomagnetic process as outlined.

In this portion of the copy station there is now provided for the (nondestructive) transfer of the image on layer 15 onto the tape 20. Since a direct "contact print" with auxiliary means is not possible in the general case, there is provided a transducer 21 having an energizing coil 22 and a core 23 defining a transducer gap 24. As an electric current flows through coil 22 a magnetic field extends across gap 24 but is somewhat deflected to pass through a portion of tape 20 in longitudinal direction therein and to follow the path of least magnetic resistance.

Thus, any portion of tape 20 travelling across gap 24 is subjected to the magnetic fields from layer 15 and from transducer 21. The total magnetization results from vector addition of the respective magnetic fields. The magnetic field induced in the active material of tape 20 by the image recording in layer 15 is, of course, again much below the coercivity of that material. Therefore, the intimate face-to-face contact between layer 15 and tape 20 has no immediate significant recording effect on the tape 20. However, if a high frequency AC current is fed to the coil 22, the magnetic field set up across gap 24 adds to the magnetization of the tape 20.

If it is presumed that the original recording was made on tape 10 with the aid of a transducer having a gap which extended in the direction of extension of the tape as well as in its direction of propagation, then the magnetic master recording is defined by longitudinal magnetization of tape 10 of variable direction and/or strength. The image on layer 15 has thus the same longitudinal orientation. The gap 24 now has likewise the same orientation so that the resulting magnetization in tape 20 is composed of two longitudinal components which have the same or opposite directions. Thus the scalar values of the two active magnetic fields are just added when having the same direction and subtracted when oppositely oriented. Should the magnetization on tape 10 be oriented differently, then the transducer 21 must be positioned differently also so that its magnetic field is always parallel to the magnetic field emanating from layer 15.

The auxiliary field is now chosen that the peak value of the magnetic field thereof is above the coercivity of the tape 20 but below the coercivity of the material of layer 15. Furthermore, the frequency of the AC current in coil 22 must be above the inverse value of the time it takes an increment of tape 20 to travel past gap 24. Preferably these two values should be apart by at least one order of magnitude. Finally copy tape and drum must travel together for a distance past the direct juxtapositioning with transducer gap 24, so that the biasing, magnetic oscillations are effective at gradually decreasing amplitudes.

The resulting magnetization is imparted upon tape 20 is an oscillating magnetic field the amplitudes of which being emphasized in one but attenuated in the opposite direction, depending on direction and magnitude of the field emanating from layer 15. The direction of the biasing field varies several times for each portion of the tape 20. Moreover, as any portion of tape 20 recedes from the maximum range of effectiveness of transducer 21, the biasing oscillations for the tape decay gradually and over several cycles. Thus, the auxiliary field itself will not leave any remanent magnetization, but the distortions of the oscillation peaks are asymmetrical in relation to the zero crossing of the oscillating auxiliary magnetic field, so that there will remain in tape 20 a remanent magnetization, due to these distortions, which in turn are equal to the magnetic field layer 15 adds to the auxiliary bias. As the coercivity of layer 15 is above the peak magnetic field strength emanating from transducer 21, the magnetization of layer 15 remains intact. This latter process is basically a conventional H.F. bias type recording which has been employed previously for the transfer of magnetic recordings from a high coercivity carrier to a low coercivity carrier. Presently it is important that the coercivity of the master from which a copy is made does not have to be related to the coercivity of the copy tape.

It will thus be understood that the recording on layer 15 is progressively transferred upon the tape 20. As the drum continues to rotate the portion of layer 15 previously recorded on will again pass underneath the lamp 16, and will be heated up and beyond the Curie point. This thermal treatment, of course, destroys the previous magnetization on carrier 15 and the heated portion of this intermediate carrier is again ready to receive new information.

It should be noted that additional copies can be made from the same image recording on layer 15 before the image is erased. Thus, additional combinations each comprising a copy tape and an auxiliary transducer, can be provided along the circumference of the drum. This leads to another modification, namely, the drum 12 may be substituted, for example, by an endless belt to accommodate a large number of copy places.

In this case, the intermediate carrier is a tape 21 having a thermomagnetic layer 151 (chromium dioxide) and a transparent backing member 131. The drum 12 serves here only as a means for defining a sufficiently larger area of contact between progressing portions of master tape 10 and intermediate carrier tape 121. The magnetically active layer on tape 10 face up (away from the circumference of drum 12) and the layer 151 faces down.

The area of contact between the tapes 121 and 10 is rather large, and a first portion (first, understood in the direction of movement) is exposed to the radiation of a flash lamp 161, heating layer 151 through backing member 131 by a short burst of radiant energy, just sufficient to heat the illuminated portion of layer 151 up to its Curie point. A mask 163 restricts the zone illuminated by lamp 161. This way the total amount of thermal energy applied anywhere is very low. Moreover, if the layer 151 has the conventional thickness of a few ten-thousandths of an inch or above the radiation will be substantially absorbed therein, and very little can reach the tape 10.

The flashes occur at the rate of progression of the two tapes to provide radiation sequentially to all portions of tape 121 as it progresses: there may be a slight overlap to ensure that every portion of tape 121 is juxtaposed to tape 10 will be heated by radiation so that all portions of tape 10 are copied. The resulting double exposure of small portions of tape 121 is not detrimental if; (1) contact between the two tapes is maintained somewhat behind the exposure zone, and (2) slippage-free contact between the tapes is ensured throughout. The control circuit 162 links the flash lamp to motor 14 of the drum 12 so that the rate of progression controls the rate with which the radiation energy flashes are produced. The image transfer from tape 121 to a copy tape such as 20 can be made in a manner similar to the transfer described above, requiring the slippage-free contact between progressive portions of tapes 20 and 121 past the transducer 21.

A flashing type heating source such as a lamp 161 with control 162 linked to the motor 14 can also be used to heat the layer 15 on drum 12 in FIGURE 2, whereby the lamp 101 may preferably be mounted inside the drum and the supporting structure 13 should then be transparent.

It will be appreciated that the flashing of radiation energy onto the intermediate carrier when already in contact with the master and with short bursts of radiation permits the most sensitive metering of the minimum of radiation needed for successfully copying the magnetic recording onto the intermediate carrier. In this case excessive thermal energy is not provided to the system which thus remains substantially at room temperature. The total amount of radiation energy needed to elevate the very thin thermomagnetic layer (15 or 151) to the paramagnetic state just for a short moment, is so low that after decay of the thermal energy into the environment, the temperature thereof is elevated only very little.

It will be fully appreciated now that the essential aspect of the invention is a double transfer using different phenomena. Use is made of the fact that materials are known having temperature dependent, different magnetic states so that any external magnetization when applied affects the material differently, depending on the state at that instant. A weak magnetic field can be made to provide a recording image if a concurrent changeover from one magnetic state to the other one inherently amplifies the magnetizing effect. The intermediate carrier is then maintained in that second magnetic state until its recording can be transferred by means of magnetic bias to the copy storage medium.

For a material which a paramagnetic at rather low temperatures this changeover can readily be obtained by heating it. The thermal energy to be expanded will cause no damage to any of the elements used. In view of the small quantities of thermal energy involved and due to the confinement of the heating just to the carrier no active cooling is needed. The subsequent reversion to the ferromagnetic state simply results from the decay of the heating energy into the environment. However this heatig-cooling sequence is merely predicated on the condition that the Curie point of the material is above room or normal environmental temperatures. Should the Curie point of the intermediate carrier be rather low, even below room temperature, then the intermediate carrier will not be heated at first as it is already paramagnetic. However the intermediate carrier then has to be cooled while in contact with the master, in order to produce the reversion from paramagnetic to ferromagnetic states. A below Curie point temperature has to be maintained until the image transfer to the copy tape has taken place; and this may require active cooling below room temperature. Materials having a large variety of Curie points including very low Curie points are, for example, mentioned in French Patents 1,452,583 and 1,453,142.

What is claimed is:

1. A system for the copying of information recorded on a first magnetizable storage medium, onto a second magnetizable storage medium, comprising:

an intermediate storage carrier having a Curie point not higher than the first medium separating the paramagnetic state of the carrier at temperatures higher than the Curie point from the ferromagnetic state at respective lower temperatures and having a room temperature coercivity above the room temperature coercivity of the second storage medium;

means for positioning the intermediate carrier for contact with said first storage medium while the intermediate carrier is in the paramagnetic state, and maintaining that contact while the intermediate carrier reverts to the ferromagnetic state;

means for placing the intermediate carrier after having reverted to the ferromagnetic state and while still in that state, into contact with said second sorage medium; and means for providing magnetic bias for the second storage medium while in contact with the carrier.

2. A system as set forth in claim 1, including radiation means for flash heating the storage carrier while in contact with the first storage medium.

3. A system as set forth in claim 1, said carrier being a layer having a continuous, endless surface, and including means for sequentially, repetitively passing the carrier through contacting positions with progressive portions of said first and second medium.

4. A system for the copying of information recorded on a first magnetizable storage medium, onto a second storage medium being of similar or dissimilar type as the first medium, comprising:

an intermediate storage carrier having a room temperature coercivity in excess of the coercivity of the second storage medium and having a Curie point not hihger than the Curie point of the first carrier;

means for heating the intermediate storage carrier above its Curie point, to render at least a portion of the carrier paramagnetic;

means for placing the paramagnetic portion of the intermediate carrier in contact with the first storage medium, the heat flow from the intermediate carrier into the first storage medium being insufficient to render the first storage medium paramagnetic, said paramagnetic portion reverting to the ferromagnetic state when in contact with the first storage medium and under the influence of the magnetic field emanating from the first storage medium, to provide a magnetic image in the intermediate storage carrier, means for placing the intermediate storage carrier when having said magnetic image in contact with said second storage medium; and means for providing a magnetizing field of alternating amplitude to the second storage medium where contacting the intermediate storage carrier, the magnetic field having peak values below the coercivity of the intermediate storage carrier, and sufficient to magnetize the second storage medium together with the magnetization of the intermediate storage carrier, the magnetizing field being effective for any point of the second storage medium contacting the intermediate storage carrier, at decaying amplitudes.

5. An indirect recording system, comprising:

a storage carrier being ferromagnetic in a first range of temperatures below the Curie point and being paramagnetic at temperatures above the Curie point;

*master copy* means *constituting a first recording medium upon which information to be reproduced has been recorded, the master copy means having a magnetic recording field representing information* for imparting [a] *the* magnetic recording field to the storage carrier when [paramagnetic] *the storage carrier is at least approaching the paramagnetic state,* the field being below the coercivity of the storage carrier at temperatures well below the Curie point *and being above the coercivity of the storage carrier at temperatures above the Curie point,* the field persisting while said portion of the carrier reverts to the ferromagnetic state;

means for placing a [recordng] *recording* medium having a coercivity below the coercivity of said storage carrier when ferromagnetic and for similar temperatures, in contact with said portion of said storage carrier when ferromagnetic; and means for applying a magnetic bias field to the recording medium where contacting the storage carrier, the bias field having alternating characteristics and peak values in the range *of* said coercivities.

6. A method for copying magnetic recordings from a first magnetic storage medium to a second similar type or dissimilar type magnetic storage medium, comprising the steps of:

*providing an intermediate storage carrier having a paramagnetic state at particular elevated temperatures and a ferromagnetic state at reduced temperatures and having in the paramagnetic state a lower coercivity than that of the first magnetic storage medium and having in the ferromagnetic state a coercivity greater than the coercivity of the second magnetic storage medium during the transfer of information from the storage carrier to the second magnetic storage medium;* placing [an] *the* intermediate storage carrier when in *a state at least approaching* the paramagnetic state into slippage-free contact with the first magnetic storage medium and maintaining that contact while the carrier reverts to the ferromagnetic state;

separating the carrier from the first storage medium when and where the carrier has reverted from the paramagnetic state to the ferromagnetic state;

placing subsequently the storage carrier in contact with the second magnetic storage medium;

magnetically biasing the second storage medium when in contact with the carrier; and separating subsequently the storage carrier from the second storage medium.

7. A system for the copying of information recorded on a first magnetizable storage medium onto a second *magnetizable* storage medium of similar or dissimilar type, comprising:

an intermediate storage carrier having temperature dependent first and second magnetic states *and having in the first magnetic state a coercivity less than the coercivity of the first magnetizable storage medium and having in the second magnetic state a coercivity greater than the coercivity of the second magnetizable storage medium during the transfer of information from the storage carrier to the second magnetizable storage medium,* permitting alignment of its magnetic dipoles with a relatively weak magnetic field when in the first state and to remain so magnetized after changeover to the second magnetic state, and resulting magnetization being substantially stronger than could result from a similar weak magnetic field applied to the carrier when in the second magnetic state only;

means for placing said carrier into contact with said first storage medium, so that the magnetization of the first storage medium provides a magnetizing field to said carrier;

means for providing a changeover from the first magnetic state in the carrier to the second state while in contact with said first storage medium;

means for placing the second storage medium in contact with the carrier where previously in contact with the first storage medium and while in the second magnetic state; and means for magnetically biasing the second storage medium while in contact with the carrier.

*8. A system for the copying of information from a first magnetizable storage medium having a first coercivity, onto a second magnetizable storage medium having a second coercivity at least approaching the first coercivity, comprising,*

*an intermediate storage carrier having temperature dependent first and second magnetic states and having in the first magnetic state a lesser coercivity than the coercivity of the first magnetizable storage medium and having in the second magnetic state a coercivity*

*greater than the coercivity of the second storage medium during the transfer of the information from the storage carrier to the second magnetizable storage medium, permitting alignment of its magnetic dipoles with a relatively weak magnetic field when in the first state and to remain so magnetized after changeover to the second magnetic state, the resulting magnetization being substantially stronger than could result from a similar weak magnetic field applied to the carrier when in the second magnetic state;*

*means for placing said carrier into contact with said first storage medium, so that the magnetization of the first storage medium provides a magnetizing field to said carrier;*

*means for providing a changeover from the first magnetic state in the carrier to the second magnetic state while in contact with said first storage medium;*

*means for placing the second storage medium in contact with the carrier where previously in contact with the first storage medium and while in the second magnetic state; and*

*means for operating upon the second storage medium, while in contact with the carrier, to facilitate the transfer to the second medium of the magnetic information previously recorded on the carrier from the first medium.*

*9. The system set forth in claim 8 wherein the second medium has magnetic characteristics corresponding to those of the first magnetizable medium and means for heating the intermediate storage carrier to a temperature providing for a changeover from the first magnetic state to the second magnetic state while the carrier is in contact with the first storage medium.*

*10. A system for the copying of information recorded on a first magnetizable storage medium, onto a second magnetizable storage medium having magnetic characteristics corresponding to those of the first magnetizable medium, comprising,*

*an intermediate storage carrier having a Curie point not higher than the first medium separating the paramagnetic state of the carrier at temperatures higher than the Curie point from the ferromagnetic state at respective lower temperatures the intermediate storage carrier having in the paramagnetic state a coercivity lower than the coercivity of the first magnetizable storage medium and having in the ferromagnetic state a coercivity higher than the coercivity of the second magnetizable storage medium during the transfer of information from the storage carrier to the second magnetizable storage medium;*

*means for positioning the intermediate carrier for contact with the said first storage medium while the intermediate carrier is in the paramagnetic state and maintaining that contact while the intermediate carrier reverts to the ferromagnetic state;*

*means for placing the intermediate carrier after having reverted to the ferromagnetic state and while still in that state into contact with said second storage medium; and*

*means for operating upon the second storage medium to affect the characteristics of the second storage medium, while in contact with the intermediate carrier, in facilitating a transfer to the second medium of the information recorded on the intermediate carrier.*

*11. A method for copying magnetic recordings from a first magnetic storage medium having a first coercivity to a second magnetic storage medium having a second coercivity approaching the first coercivity comprising the steps of:*

*providing an intermediate storage carrier having a paramagnetic state at particular elevated temperatures and a ferromagnetic state at reduced temperatures and having in the paramagnetic state a lower coercivity than that of the first magnetic storage medium and having in the ferromagnetic state a coercivity greater than the coercivity of the second magnetic storage medium during the transfer of information from the storage carrier to the second magnetic storage medium;*

*placing the intermediate storage carrier when in the paramagnetic state into slippage-free contact with the first magnetic storage medium and maintaining that contact while the carrier reverts to the ferromagnetic state;*

*separating the carrier from the first storage medium when and where the carrier has reverted from the paramagnetic state to the ferromagnetic state;*

*placing subsequently the storage carrier in contact with the second magnetic storage medium;*

*while the storage carrier is in contact with the second magnetic storage medium, affecting the magnetic response of the second magnetic storage medium to the magnetic information previously recorded on the storage carrier from the first magnetic storage medium to facilitate the transfer of such magnetic information from the storage carrier to the second magnetic storage medium; and*

*separating subsequently the second storage medium from the storage carrier.*

*12. A method as set forth in claim 11 whrein the second storage medium has magnetic characteristics corresponding to those of the first magnetic storage medium and wherein the intermediate storage carrier is heated to temperatures at least approaching the particular elevated temperatures while the intermediate storage carrier is in slippage-free contact with the first magnetic storage medium.*

References Cited

The following references, cited by the Examiner, are of record in the patented file of this patent or the original patent.

UNITED STATES PATENTS

| | | | |
|---|---|---|---|
| 2,890,288 | 6/1959 | Newman | 179—100.2 E |
| 3,364,496 | 1/1968 | Greiner et al. | 179—100.2 E |
| 2,738,383 | 3/1956 | Herr et al. | 179—100.2 |
| 3,250,636 | 5/1966 | Wilferth | 346—74 |
| 3,277,244 | 10/1966 | Frost | 179—100.2 |

BERNARD KONICK, Primary Examiner

R. S. TUPPER, Assistant Examiner

U.S. Cl. X.R.

346—74 MT